(12) United States Patent
Kao

(10) Patent No.: US 6,717,937 B1
(45) Date of Patent: Apr. 6, 2004

(54) METHOD AND APPARATUS FOR VOICE OVER INTERNET PROTOCOL RESOURCE MANAGEMENT

(75) Inventor: Chi-Chang Kao, Sunnyvale, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/221,189

(22) Filed: Dec. 23, 1998

Related U.S. Application Data

(60) Provisional application No. 60/089,831, filed on Jun. 19, 1998, and provisional application No. 60/090,075, filed on Jun. 19, 1998.

(51) Int. Cl.[7] .............................................. H04J 12/26
(52) U.S. Cl. ....................................................... 370/352
(58) Field of Search ................................. 370/229, 351, 370/352, 357, 389, 400, 901, 912; 379/900; 709/100, 105, 227, 228, 229

(56) References Cited

U.S. PATENT DOCUMENTS

| | | | | |
|---|---|---|---|---|
| 5,539,883 A | * | 7/1996 | Allon et al. ................. | 709/105 |
| 5,610,910 A | * | 3/1997 | Focsaneanu et al. ........ | 370/351 |
| 5,646,936 A | * | 7/1997 | Shah et al. .................. | 370/228 |
| 5,867,495 A | * | 2/1999 | Elliott et al. ................. | 370/352 |
| 6,118,866 A | * | 9/2000 | Shtivelman .................. | 379/309 |
| 6,161,137 A | * | 12/2000 | Ogdon et al. ................ | 709/224 |
| 6,256,309 B1 | * | 7/2001 | Daley et al. ................. | 370/395 |
| 6,487,196 B1 | * | 11/2002 | Verthein et al. ............. | 370/352 |

* cited by examiner

*Primary Examiner*—Ajit Patel
*Assistant Examiner*—William Schultz
(74) *Attorney, Agent, or Firm*—Blakely Sokoloff Taylor & Zafman LLP

(57) ABSTRACT

A method for receiving a telephone call being transmitted on a network using Internet protocol (IP network) is disclosed. A request to handle the telephone call is received from an originating node on the IP network by a leader node on the IP network. A receiving node, having a receiving address, is selected to receive the telephone call. The receiving node is selected from a set of nodes comprising the leader node and at least one follower node, where each node in the set of nodes can receive the telephone call. The receiving address is transmitted by the leader node to the originating node using the IP network. The leader node causes the originating node to transmit the telephone call to the receiving node using the IP network.

24 Claims, 1 Drawing Sheet

METHOD AND APPARATUS FOR VOICE OVER INTERNET PROTOCOL RESOURCE MANAGEMENT

CROSS-REFERENCES TO RELATED APPLICATIONS

This application claims the benefit of U.S. Provisional Application No. 60/089,831, filed Jun. 19, 1998, which is incorporated herein by reference, and of U.S. Provisional Application No. 60/090,075, filed Jun. 19, 1998, which is incorporated herein by reference.

BACKGROUND OF THE INVENTION

1. Field of the Invention

This invention relates to routing of telephone calls and, more particularly, to connecting of telephone calls over networks using Internet protocol (IP networks).

2. Background Information

The traditional telephone network is a switched network that provides users with a dedicated end-to-end circuit for the duration of each call. Circuits are reserved between the originating switch, tandem switches (if any), and the terminating switch based on the called party number to create the end-to-end circuit.

Recently, telephone calls have been transmitted over digital networks using packet switched networks using Internet protocol (IP networks), termed voice over IP (VoIP) transmission. Packet-switched IP networks provide shared, virtual circuit connections between users. Voice information to be transmitted across an IP network is converted into digital data and broken up into multiple, discrete packets. Individual packets may travel over different network paths to reach the final destination where the packets are reassembled in the proper sequence to reconstruct the original voice information.

A virtual circuit is created between an originating node that receives the call origination signaling and a terminating node that connects to the called party. The originating node must retrieve an IP address for a node that can complete the call based on the dialed number. A node has a limited capacity for the number of calls it can handle. A plurality of nodes with identical capabilities can be deployed to provide the required capacity for a given location. Therefore, the originating node for a VoIP telephone call may retrieve a list of IP addresses for receiving nodes that can complete the telephone call to the called number. The originating node must then "hunt" through the list of IP addresses to locate a node that has available capacity to handle the call from the originating node. This hunting is time consuming, adds additional traffic to the IP network, and increases the message traffic to the terminating node. Further, since it is impractical for the originating node to query all available nodes, the first node found with available capacity will be selected to receive the call while other nodes with lower utilization remain available.

The quality of service (QoS) for VoIP degrades as congestion increases. The QoS for all calls being handled by a node deteriorates as the number of calls being handled increases. Placing a call to a node other than the least used node results in a lower QoS than would be obtained if the least used node were chosen to handle the call. Further, QoS for all calls being handled by the node is reduced as additional calls are added.

As nodes are added or removed to adjust the capacity of a location, configuration information must be broadcast to all locations on the IP network to make the node available to receive calls. Maintaining the configuration information for even a modestly sized IP network quickly becomes time consuming and difficult.

Accordingly, what is needed is a method and apparatus for managing the nodes at a single location to allow the call handling load to be balanced among all available nodes at the location. Further, the method and apparatus should allow nodes to be added or removed without requiring a change to the configuration information for the IP network.

SUMMARY OF THE INVENTION

A method for receiving a telephone call being transmitted on a network using Internet protocol (IP network) is disclosed. A request to handle the telephone call is received from an originating node on the IP network by a leader node on the IP network. A receiving node, having a receiving address, is selected to receive the telephone call. The receiving node is selected from a set of nodes comprising the leader node and at least one follower node, where each node in the set of nodes can receive the telephone call. The receiving address is transmitted by the leader node to the originating node using the IP network. The leader node causes the originating node to transmit the telephone call to the receiving node using the IP network.

DETAILED DESCRIPTION OF THE INVENTION

The present invention provides a method and apparatus for managing voice over Internet protocol (VoIP) nodes at a single location to allow the call handling load to be balanced among all available nodes at the location. Further, the method and apparatus allow nodes to be added or removed from the network using Internet protocol (IP network) without requiring a change to the configuration information for the IP network.

Figure 1:
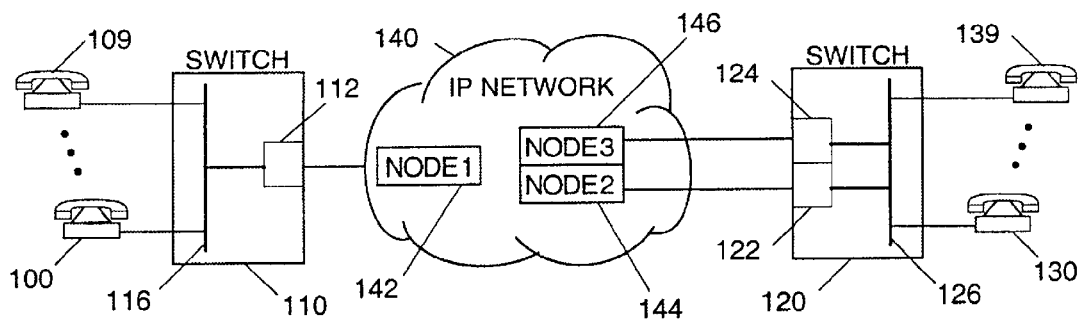
FIG. 1 shows a system that embodies the invention.

FIG. 1 is a telephone system that embodies the invention. The system includes two or more switches 110, 120, a plurality of terminal devices connected to the switches 100–109, 130–139, and one or more networks 140 that connect the switches 110, 120. A call placed through a first terminal device 100, such as a telephone handset, is connected through a first switch 110 to a network, such as an IP network 140. The IP network 140 transfers the data from a first node 142 associated with the first switch 110 to a second node 144 associated with a second switch 120. The second switch 120 connects the call from the IP network 140 to a second terminal device 130. Each switch 110, 120 contains one or more interface circuits 112, 122, 124 that connect a node in the IP network 140 to a bus 116, 126 in the switch 110, 120. The bus 116, 126 provides cross-bar switching to connect one of the terminal devices 100–109, 130 to 139 connected to the switch 110, 120 to one of the nodes 142, 144, 146 connected to the switch 110, 120. Each interface circuit 112, 122, 124 has the capability to provide connections for a limited number of active terminal devices. For example, an interface may be limited to providing eight connections. A switch 120 may contain multiple interface circuits 122, 124 that provide multiple nodes 144, 146 on the IP network 140 to provide the required number of available circuits for handling the traffic for the terminal devices 130 to 139 connected to the switch 120.

The present invention provides a leader card as the first interface circuit 122 in a switch 120. The node provided by the leader card 122 is the only node 144 known to the other switches 110 in the system. When a call originates at a first switch 110 with a destination of a second switch 120 that is served by two or more nodes 144, 146, the first switch 110 will only find information about the first node 144 for connecting to the second switch 120. The first switch 110 will attempt to connect to the second switch 120 by transmitting a call setup message to the second switch 120. ITU-T Recommendation H.255.0 provides an exemplary method of transmitting a call setup message.

The leader card 122 provides additional supervisory capabilities in addition to being able to provide connections between the local terminal devices 130 to 139 and a node 144 on the IP network 140. The leader card 122 generally maintains information about the local configuration of the switch 120 and the interface cards 122, 124 and associated nodes 144, 146 available to provide connection to the switch 120. The leader card 122 preferably maintains information about the number of unused circuits that remain on each interface card 122, 124. When the leader card 122 receives a call setup message, the leader card selects an interface card 122, 124 to provide the connection for the call. In one embodiment, the interface card 122, 124 is selected as the card with the largest number of unused circuits. In another embodiment, the leader card 122 is not selected to provide a connection for a call unless no unused circuits are available on another interface card. The leader card 122, then causes the call to be connected through the selected interface card 122, 124. In one embodiment, the leader card responds to the call setup message with a call forward message that provides the IP address of the interface circuit 122, 124 selected by the leader card 122 to provide the connection for the call. In another embodiment, the leader card 122 further causes the selected interface card 122, 124 to reserve a circuit for the completion of the forwarded call. The calling system then transmits a second call setup message, now directed to the node 144, 146 selected by the leader card 122, to establish the connection for the call.

The leader card 122 preferably contains all the functionality of an interface card 124 and the resource management functions that distinguish the leader card 122 represent additional capabilities. In one embodiment, the additional capabilities are provided by additional programs being loaded on an interface card to make it a leader card.

The IP network address 144 handled by the leader card 122 is the only address that is known to other switches 110 in the system. Additional nodes 146 can be added to a switch 120 without changing the configuration information maintained by other switches in the system. Only the leader card 122 is required to be aware of the follower cards 124 in a switch 120. This increases system security because less configuration information for each switch is maintained throughout the system.

Figure 2:
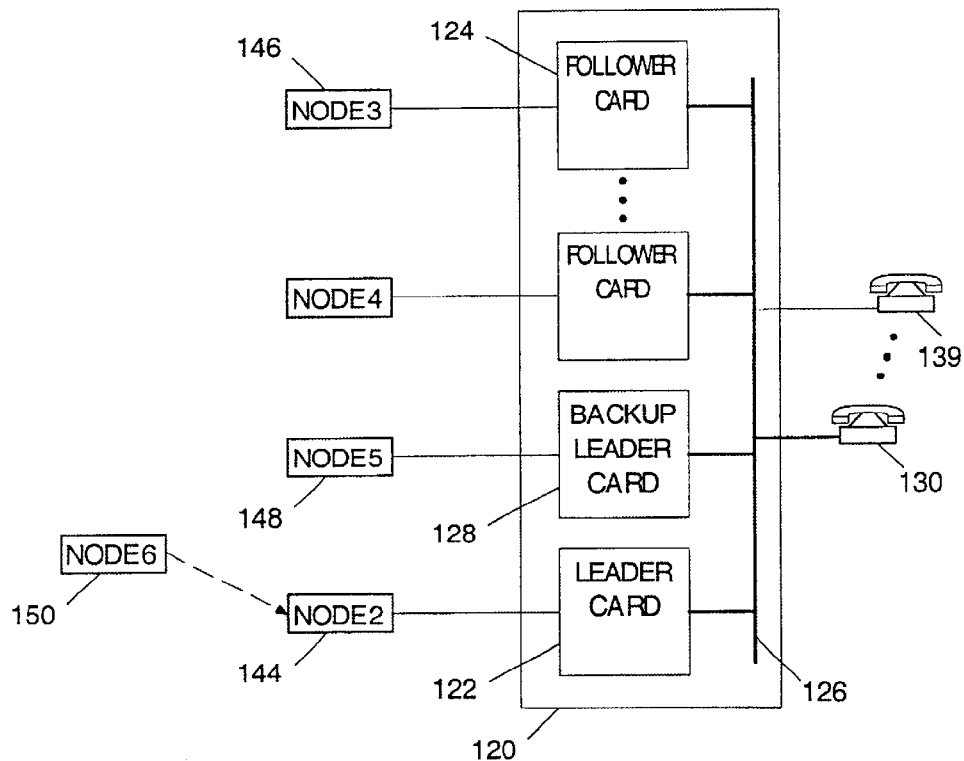
FIG. 2 shows another embodiment of the invention.

If a leader card 122 ceases to function, the switch 120 served by the leader card 122 will be unable to receive calls. FIG. 2 shows another embodiment with a backup leader card 128 that maintains the same information as the leader card 122 to stay in a "hot standby" mode. The backup leader card 128 monitors the continued operation of the leader card 122. In one embodiment, the leader card 122 produces a "heart beat" signal that the backup leader card 128 monitors to detect a failure of the leader card 122. If the leader card 122 fails, the backup leader card 128 assumes the functions of the leader card 122.

In one embodiment, an alias IP address 150 is used as the address for the switch 120. Normally, the alias IP address 150 is redirected to the leader card's IP address 142. If the backup leader card 128 assumes the functions of the leader card 122, then the alias IP address 150 is redirected to the IP address 148 of the backup leader to allow the transition from leader 122 to backup leader 128 to be invisible to the other switches in the system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method, for receiving a telephone call being transmitted on a network using Internet protocol (IP network), comprising:

receiving a request to handle the telephone call from a third node on the IP network by a first node on the IP network, the first node being one node from a set of nodes provided by a switch, the first node being the only node of the set of nodes that is known to other switches on the IP network;

selecting a second node, having a receiving address that is not known to other switches on the IP network, to receive the telephone call, the second node being selected from the set of nodes;

transmitting the receiving address by the first node to the third node using the IP network; and causing the third node to transmit the telephone call to the second node using the IP network.

2. The method of claim 1, where selecting the second node further comprises selecting a node in the set of nodes having a largest number of unused channels.

3. The method of claim 1, where selecting the second node further comprises not selecting the first node if any other node in the set of nodes has unused channels.

4. The method of claim 1, where receiving the request further comprises receiving a call setup message.

5. The method of claim 1, where transmitting the receiving address and causing the third node to transmit the telephone call to the second node further comprises transmitting a forward call message.

6. The method of claim 1, further comprising, after selecting a second node, reserving a channel on the second node to receive the telephone call.

7. The method of claim 1, further comprising maintaining a table of availability Information for the set of nodes, and where selecting the second node is responsive to the table of availability information.

8. The method of claim 7, further comprising transferring the table of availability information to a fourth node periodically, monitoring the first node, and transferring duties of the first node to the fourth node if the first node ceases to function.

9. A switch to connect telephone calls being transmitted on a network using Internet protocol (IP network) to terminal devices connected to the switch, the switch comprising:

a plurality of interface circuits, each of the plurality of interface circuits providing a node on the IP network and a plurality of connections for active terminal devices;

a bus coupled to the plurality of interface circuits to provide cross-bar switching between terminal devices connected to the switch and the plurality of interface circuits; and a leader card that includes one of the plurality of interface circuits that provides a first node that is the only node in the switch that is known to other switches on the IP network, the leader card to receive a request to handle the telephone call from a third node on the IP network, to select a second node having a receiving address that is not known to other switches on the IP network to receive the telephone call, the second node being selected from the set of nodes provided by the plurality of Interface circuits, and to transmit the receiving address to the third node using the IP network and to transmit a message to cause the third node to transmit the telephone call to the second node using the IP network.

10. The switch of claim 9, where the controller further selects a node in the set of nodes having a largest number of unused channels.

11. The switch of claim 9, where the controller further selects a node other than the first node if another node has an unused channel.

12. The switch of claim 9, where the request further comprises a call setup message.

13. The switch of claim 9, where the receiving address and the message to cause the third node to transmit the telephone call to the second node are transmitted in a forward call message.

14. The switch of claim 9, where the controller, after selecting the second node, further reserves a channel on the second node to receive the telephone call.

15. The switch of claim 9, where the controller further maintains a table of availability information for the set of nodes, and selects the second node responsive to the table of availability information.

16. The switch of claim 15, where the controller further transfers the table of availability information to a backup leader card periodically, and the backup leader card monitors the leader card and assumes duties of the leader card if the leader card ceases to function.

17. A system, for receiving a telephone call being transmitted on a network using Internet protocol (IP network), comprising:

a first device, coupled to the IP network, having a first address known to a third device coupled to the IP network, to receive a request to handle the telephone call from the third device;

at least one second device, coupled to the IP network and coupled to the first device, having a second address known to the first device and not known to the third device;

the first device selecting a fourth device having a receiving address from a set of devices comprising the first device and the at least one second device to receive the telephone call, where each device in the set of devices can receive the telephone call;

the first device transmitting the receiving address to the third device using the IP network; and the fourth device receiving the telephone call from the third device using the IP network.

18. The system of claim 17, where the first device further selects a device from the set of devices having a largest number of unused channels.

19. The system of claim 17, where the first device further selects a device other than the first device if the device other than the first device has an unused channel.

20. The system of claim 17, where the request further comprises a call setup message.

21. The system of claim 17, where the receiving address is transmitted to the third device in a forward call message.

22. The system of claim 17, where the first device, after selecting the fourth device, further reserves a channel on the fourth device to receive the telephone call.

23. The system of claim 17, where the first device further maintains a table of availability information for the set of devices, and selects the fourth device responsive to the table of availability information.

24. The system of claim 23, where the first device further transfers the table of availability information to a fifth device periodically, and the fifth device monitors the first device and assumes duties of the first device if the first device ceases to function.

* * * * *